US010304227B2

(12) United States Patent
Colbert

(10) Patent No.: US 10,304,227 B2
(45) Date of Patent: May 28, 2019

(54) SYNTHESIZING IMAGES OF CLOTHING ON MODELS

(71) Applicant: Marcus C. Colbert, Emerald Hills, CA (US)

(72) Inventor: Marcus C. Colbert, Emerald Hills, CA (US)

(73) Assignee: Mad Street Den, Inc., Fremont, CA (US)

( * ) Notice: Subject to any disclaimer, the term of this patent is extended or adjusted under 35 U.S.C. 154(b) by 36 days.

(21) Appl. No.: 15/634,171

(22) Filed: Jun. 27, 2017

(65) Prior Publication Data

US 2018/0374249 A1    Dec. 27, 2018

(51) Int. Cl.
*G09G 5/00* (2006.01)
*G06T 11/60* (2006.01)
*G06K 9/62* (2006.01)

(52) U.S. Cl.
CPC ............ *G06T 11/60* (2013.01); *G06K 9/6256* (2013.01); *G06T 2210/16* (2013.01)

(58) Field of Classification Search
CPC ........ G06T 19/00; G06T 19/20; G06T 19/006
See application file for complete search history.

(56) References Cited

U.S. PATENT DOCUMENTS

| | | | | |
|---|---|---|---|---|
| 5,680,528 A * | 10/1997 | Korszun | ................ | A41H 3/007 345/630 |
| 7,308,332 B2 * | 12/2007 | Okada | ................ | G06F 17/5009 345/419 |
| 7,657,340 B2 * | 2/2010 | Lind | ...................... | A41H 3/007 345/419 |
| 2004/0049309 A1 * | 3/2004 | Gardner | ................... | A41H 1/00 700/132 |
| 2011/0234581 A1 * | 9/2011 | Eikelis | ............... | G06K 9/00228 345/419 |
| 2011/0298897 A1 * | 12/2011 | Sareen | .................. | G06N 3/006 348/47 |
| 2014/0010449 A1 * | 1/2014 | Haaramo | ................ | G06T 19/00 382/173 |
| 2016/0275375 A1 * | 9/2016 | Kant | .................... | G06K 9/4604 |
| 2017/0278135 A1 * | 9/2017 | Majumdar | ......... | G06Q 30/0256 |

(Continued)

OTHER PUBLICATIONS

Hu et al., A Hybrid Neural Network and Immune Algorithm Approach for Fit Garment Design, Textile Research Journal, vol. 79, Issue 14, pp. 1319-1330 (Year: 2009).*

(Continued)

*Primary Examiner* — Charles Tseng
(74) *Attorney, Agent, or Firm* — Mersenne Law

(57) ABSTRACT

Neural networks of suitable topology are trained with pairs of images, where one image of each pair depicts a garment, and the other image of each pair depicts the garment being worn by a model. Once trained, the neural network can synthesize an image based on a new image of a garment, where the synthesized image could plausibly have appeared in the training set, paired with the new image of the garment. Quantitative parameters controlling the image synthesis permit adjustment of features of the synthetic image, including the skin tone, body shape and pose of the model, accessories depicted in the synthetic image, and characteristics of the garment as depicted, such as length, sleeve style, collar style or tightness.

6 Claims, 5 Drawing Sheets

(56) References Cited

U.S. PATENT DOCUMENTS

2018/0047192 A1  2/2018 Kristal et al.
2018/0060701 A1* 3/2018 Krishnamurthy .... G06K 9/6269

OTHER PUBLICATIONS

Recurrent Inference Machines for Solving Inverse Problems, Patrick Putzky & Max Welling, arXiv:1706.04008v1, Jun. 13, 2017.
Multi-View Image Generation from a Single-View, Bo Zhao, Xiao Wu, Zhi-Qi Cheng, Hao Liu, Jiashi Feng, arXiv:1704.04886v2, May 23, 2017.
Image-to-Image Translation with Conditional Adversarial Networks, Phillip Isola, Jun-Yan Zhu, Tinghui Zhou, Alexi A. Efros, arXiv:1611.07004v1, Nov. 21, 2016.

* cited by examiner

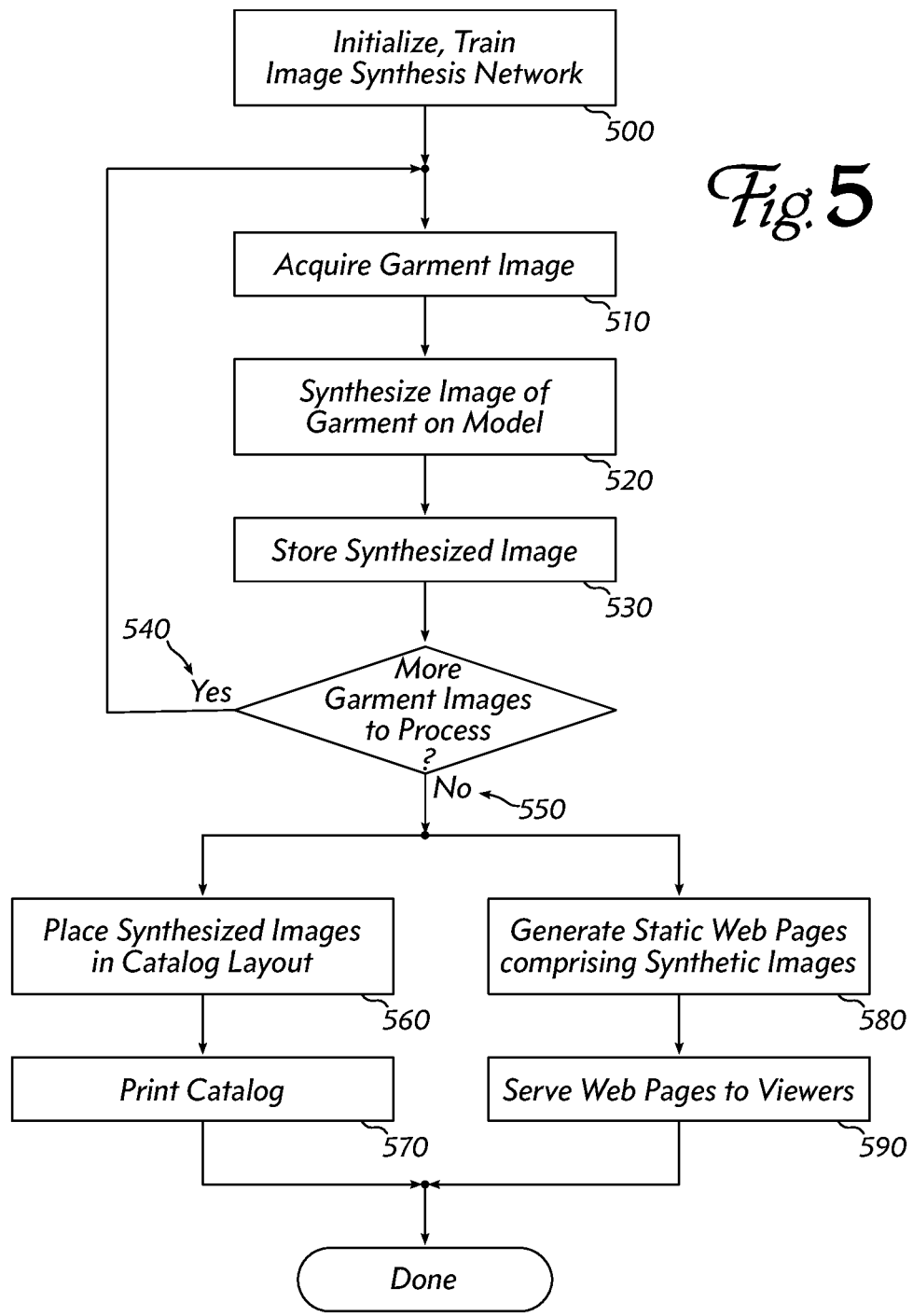

SYNTHESIZING IMAGES OF CLOTHING ON MODELS

CONTINUITY AND CLAIM OF PRIORITY

This is an original U.S. patent application.

FIELD

The invention relates to automatic image generation. More specifically, the invention relates to methods for creating synthetic images based on a training set of image pairs. Once trained, an embodiment can accept a new image that is like one member of an image pair, and create a synthetic image representing what the other image of the pair might look like.

BACKGROUND

Neural networks are computing systems that are inspired by biological processes. In particular, they comprise a plurality of modules that are designed to operate similarly to the way biological neurons are thought to function. Neurons are often modeled as multiple-input, single-output thresholding accumulators, which "fire" if enough of the inputs are active enough. (The output of one model neuron may be connected to a number of subsequent neurons model inputs, or even to previous neuron models in a feedback loop.) Although the function of a single neuron model is quite simple, it has been observed that a large number of models operating simultaneously, which are configured or "trained" properly, can produce surprisingly good results in problems that are difficult to address with traditional data processing or programming techniques.

One common neural-network task is image recognition: a plurality of neurons are arranged in a pyramid-like hierarchy, with an array of input neurons for each pixel of an image, followed by one or more decreasing-sized layers of neurons, and where an output neuron is designated to indicate whether an input image has a characteristic of interest. Such a network can be "trained" by exposure to a set of images where the characteristic of interest is present or absent. For example, the characteristic may be whether a penguin is present in the image. Once trained, the network may be able to determine fairly accurately whether a penguin is depicted in a new image, not part of the training set.

Neural networks can also be used to generate or synthesize new information based on prior training and a random seed. For example, biophysicist Dr. Mike Tyka has experimented with training neural networks to generate images that resemble artistic portraits of human faces, although there is no actual subject involved, and any resemblance to an individual is purely coincidental.

Although neural networks are not infallible (recognizers may misidentify a target, or generative networks may construct output that is not useable for the intended purpose) they are often adequate for practical use in applications where deterministic methods are too slow, too complex or too expensive. Thus, neural networks can fill a gap between rote mechanical methods that are easy to implement on a computer, and labor-intensive methods that depend on human judgment to achieve best results.

SUMMARY

A neural network is trained with pairs of images, where one image of a pair shows a garment, and the other image shows a model wearing the garment. Then, a new image is presented to the trained network, and a synthetic image that might be the new image's pair is automatically generated. The synthetic image is displayed to a user.

BRIEF DESCRIPTION OF DRAWINGS

FIG. 5 is a flow chart outlining another application of an embodiment.

DETAILED DESCRIPTION

Most people wear clothes, and many people choose and purchase some of their clothes from vendors who do not (or cannot) offer the customer an opportunity to try on the garment before purchase. Catalog and online retailers (among others) often go to great lengths to produce photos of their garments worn by representative models and presented in common situations; these photos are important to convey the impression of the fit and appearance of a garment to a customer who cannot see it in person.

Embodiments of the invention use neural networks to synthesize images of models wearing garments from less-expensive images of the garments alone. Beneficially, the synthesis process exposes controls that can be used to adjust characteristics of the synthesized image. For example, the skin tone, body shape, pose and other characteristics of the model in the synthesized image may be varied over a useful range. This permits a user (e.g., a customer) to adjust a synthetic "as-worn" image to resemble the user more closely. Thus, in addition to reducing the cost of producing representative photos, an embodiment allows a user to get a better idea of how a particular garment may appear when worn by the user. This improved representation may improve a retailer's chance of making a sale (or of avoiding the return of a garment that, upon trying on, the purchaser did not like).

Figure 1:
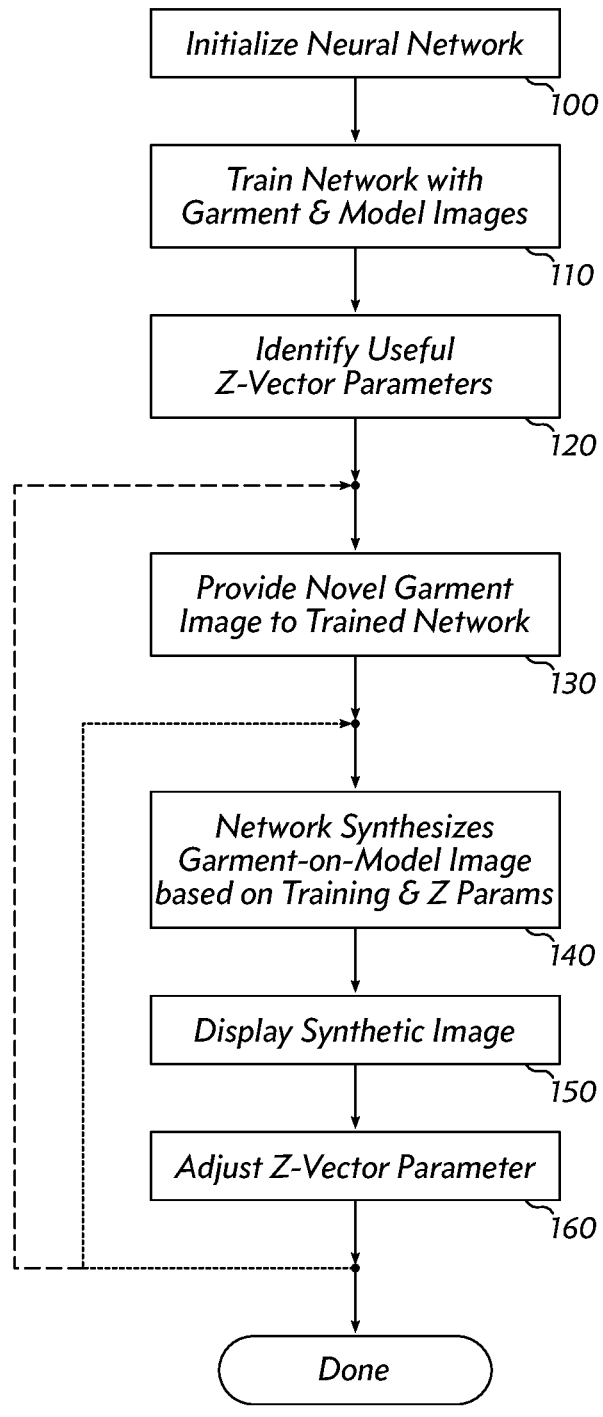
FIG. 1 is a flow chart outlining a method according to an embodiment of the invention.

FIG. 1 shows an overview of a central portion of an embodiment's operations. The method begins by initializing a neural network (100). This network is trained using pairs of images (110): one image of each pair shows a garment (e.g., a garment laid out flat on a neutral surface); and the other image of each pair shows a model wearing the garment. Once training is complete, useful parameters from the "Z vector" (described below) are identified (120).

Now, in typical use, a garment image is provided to the trained network (130). The garment image need not be (and preferably is not) one of the training images, but instead is an image without a corresponding mate. The network synthesizes an image of this garment on a model, based on the network's training and parameters of the Z vector (140). The synthetic image is displayed to the user (150). The user may adjust a Z vector parameter (160) and a new image is synthesized (140) and displayed (150). The adjustment and re-synthesizing may be repeated as often as desired to produce a variety of synthetic images of a model wearing the garment.

The Z vector parameters may control characteristics such as the model's skin tone, body shape and size, pose or position, and even accessories (e.g., shoe style, handbags, glasses, scarves or jewelry), so the user may be able to control the synthesis process to produce images that more closely resemble what the garment would look like if worn by the user.

Figure 2:
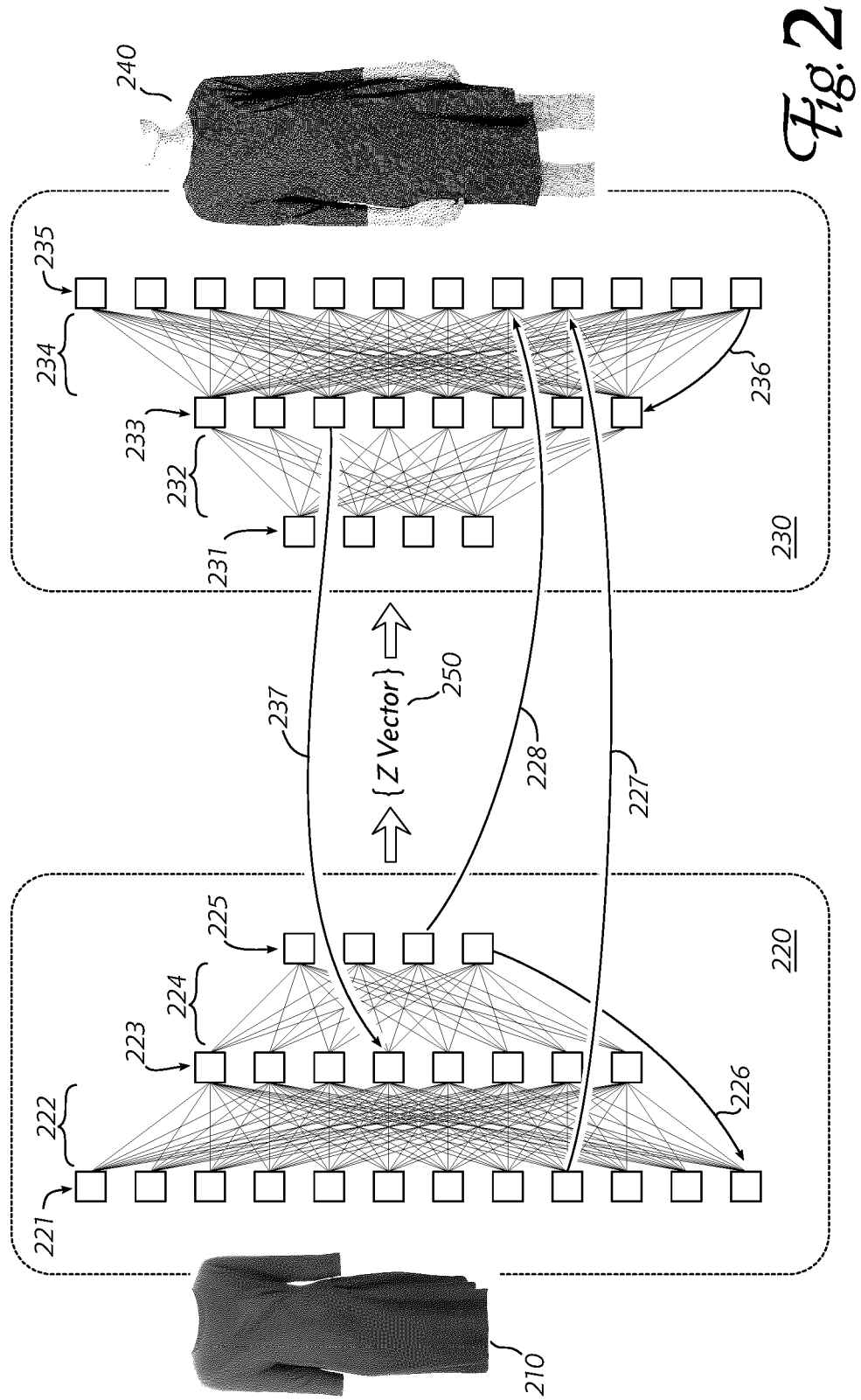
FIG. 2 is a simplified representation of data flow through a neural network implementing an embodiment of the invention.

FIG. 2 shows a conceptual representation of a Generative Adversarial Network, which is one type of neural network that can be used in an embodiment of the invention. Information can generally be understood as passing from left to right across the drawing. An image of a garment 210 is communicated to an input layer 221 of a first neural network 220. The input layer may have approximately as many input elements as there are pixels in the input image (i.e., many more elements than are shown in this drawing). Or, an input layer may comprise elements for each color channel of each input pixel (e.g., red, green and blue elements for each pixel). The input layer 221 is connected to an intermediate layer 223 by a network of variable connection weights 222, and the intermediate layer 223 is connected to an output layer 225 by a similar network 224. The connections are shown all-to-all, but each connection may be associated with a variable weight, so some connections may be effectively absent (weight=0). In addition to layer-to-layer connections, an embodiment may use feedback connections 226, which may go to an immediately preceding layer, or to an earlier layer. Each neural network may have more than the three layers shown here. In a preferred embodiment, about seven (7) layers are used.

Note that each layer of neural network 220 (traveling left to right) is smaller than the preceding layer. Thus, the network can be thought of as performing a kind of compression, resulting in Z-Vector 250, which in many embodiments is a vector of real numbers that comprises the outputs of the last layer of network 220.

Z-Vector 250 is used as an input to a second neural network 230. This network is similar in structure to network 220 (it comprises layers of model neurons 231, 233 and 235, interconnected by variable-weight connections 232, 234), but the number of elements in each layer is increasing (in the direction of data flow). Like network 220, network 230 may include feedback connections (e.g., 236) which carry data in the "opposite" direction. The output of network 230, once the GAN has been trained, is a synthetic image 240 that represents what garment 210 may look like when worn by a model.

In addition to the various intra-network connections, an embodiment may use inter-network connections 227, 228 or 237. These typically connect layers of similar depth (227, 237), but provisions may be made for connections between different depths (228). (Here, "depth" means "levels away from input of left-hand network 220 or levels away from output of right-hand network 230," in recognition of the fact that the networks are to some degree mirror images of each other.) These connections may be referred to as "skip connections." Conceptually, a skip connection provides a simple, direct way for the networks to pass through information that does not affect the "compression" and "synthesis" operations very much. For example, garment color is largely orthogonal to questions of how fabric tends to drape and hang on a figure—a red dress and a blue dress of equivalent construction would look about the same on a model, except for the color itself. Thus, a skip connection can carry the color of the sample image directly through to the output network, rather than relying on the input network to recognize the color and communicate it to the generative network through the Z vector.

Figure 3:
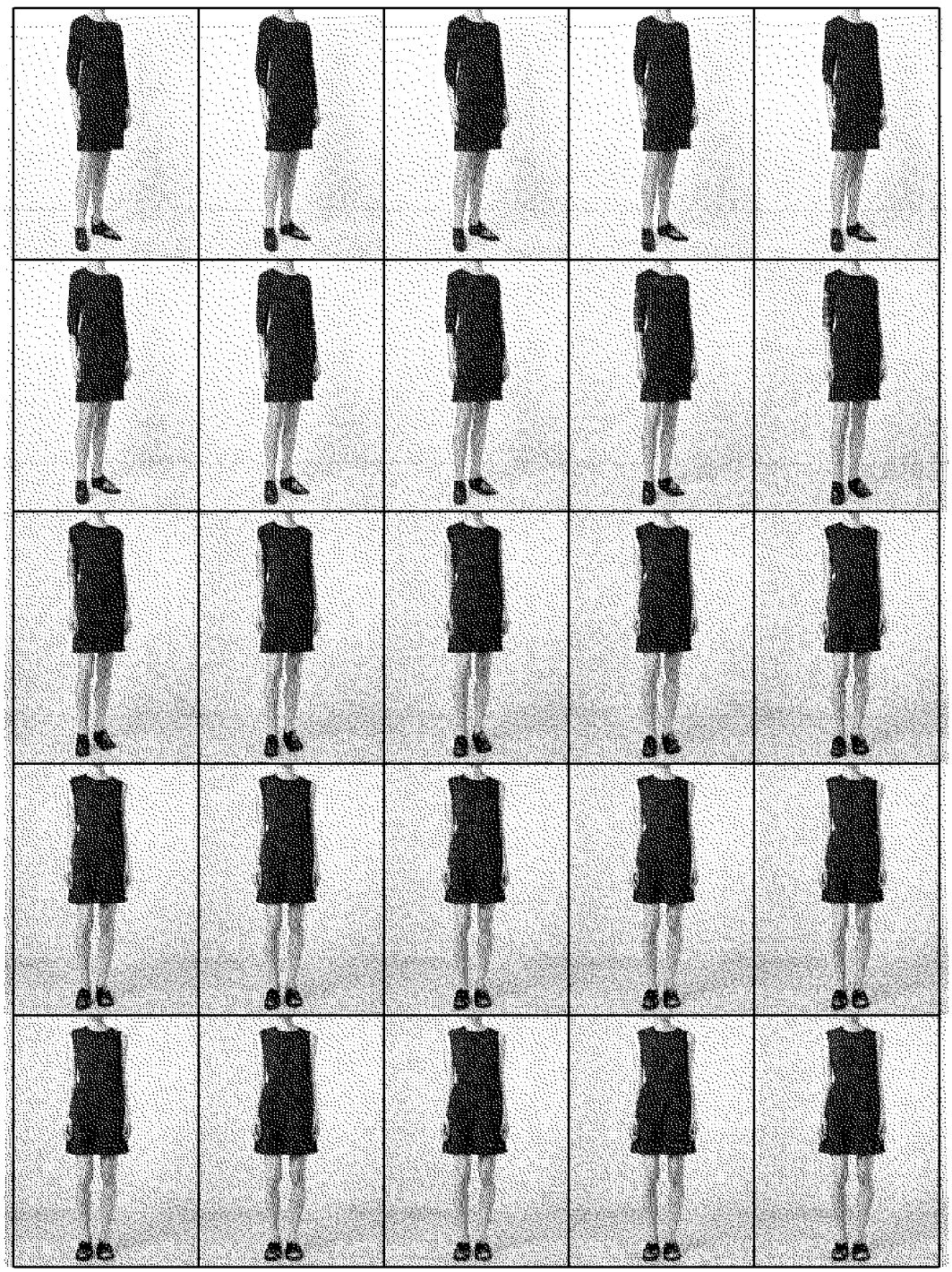
FIG. 3 shows a range of synthetic images created as a "model pose" image control parameter is varied.

Returning to the idea that network 220 performs something like compression, it turns out that some of the Z-Vector elements encode characteristics that the GAN has learned to recognize (and to use in image synthesis) after processing the training image pairs. For example, one Z-Vector element may control model skin tone. Another element may control model pose (including whether the model is facing the camera or turned to one side, or the position of the arms or legs). An element may control the style of shoe depicted in the synthesized image—these may be similar to one of the styles learned from the training images, but the output image shoes are not simply copied from one of the training-image model's legs. Instead, the generative network 230 constructs an image, including shoes or other accessories, that looks like it might have been seen among the training images, if the input image 210 had had a corresponding model-garment companion image. And critically, adjusting the Z-Vector elements can cause the generative network to make a new image with a different skin tone, model pose, or shoe style. Z-Vector elements may also control details such as dress length, sleeve length, or collar style. I.e., the synthesized image may show ways in which the garment might be altered, as well as ways in which the model might be altered. In one exemplary embodiment, a Z-Vector element controls model rotation, so even though the input dress image is shown head-on, a range of plausible dress-on-model images can be produced, with the model turning from left to right across the range. An example of this is shown in FIG. 3. All 25 images were synthesized from a single image of a black dress by a network trained with a variety of dress/model pairs of photos.

Although the Generative Autonomous Network ("GAN") depicted and described with reference to FIG. 2 is one type of neural network that is well-suited for use in an embodiment, other known types are also useable. For example, network configurations known in the art as Recurrent Neural Networks ("RNNs"), Recurrent Inference Machines ("RIMs"), and Variational Autoencoders ("VAEs") can all be trained with pairs of images as described above, can generate new synthetic images that could plausibly be the pair-mate of a new input image, and expose quantitative control parameters that can be varied proportionally to adjust features or characteristics of the synthetic images. The foregoing aspects of a neural network are important for use in an embodiment of the invention, namely:

Trainable with pairs of images;

Generates a synthetic image from a new input image, where the synthetic image resembles a "pair" image corresponding to the new input image (i.e., the new input image and the synthetic image could plausibly have been a pair in the training set); and Exposes quantitative control parameters that can be manipulated to change characteristics of the synthetic image, including characteristics such as:

| | |
|---|---|
| Model skin tone | Garment length |
| Model pose | Garment sleeve style |
| Model body weight, shape | Garment collar style |
| Accessories | Garment fit tightness |

One feature of a neural network suitable for use in an embodiment was mentioned briefly above, but bears further discussion. In FIG. 2, each node at a particular level was drawn with connections to all nodes at the next level. In addition, a few inter-level connections were shown. However, a neural network may be fully-connected: the weighted output of each node may form part of the input signal to every other node (even including the node itself). Such a network is very difficult to depict in a two-dimensional figure, but it is a common topology, known to practitioners of ordinary skill. Another alternative is a convolutional neural network. This topology is more space-efficient than a fully-connected network, so it can often operate on larger input images (and produce higher-resolution output images). Again, convolutional networks are known to those of ordinary skill in the art, and can be used to good effect by adhering to the principles and approaches described herein.

In an exemplary embodiment of the invention using a Generative Adversarial Network, input images may be about 192×256 pixels, with three color channels for each pixel (red, green & blue). Thus, the input layer comprises 192×256×3=147,456 neuron model elements. Subsequent layers decrease by a factor of two, and the Z vector ends up as 512×4×3=6,144 scalars. The generative network may mirror the input network, starting with the Z vector and emitting a 192×256 synthetic color image.

Not all elements of the Z vector correspond to a recognizable characteristic such as "skin tone," "dress length," "shoe style" or "model pose." The effects of individual vector elements (and of subsets of the vector) may be determined empirically, or by providing additional information about training image pairs (e.g., by tagging the images with characteristic descriptions) and propagating the additional information through the network during training.

One favorable approach to determining Z Vector component effect is to perform Principal Component Analysis ("PCA") on the Z Vector, to identify a smaller vector Z' whose components are largely linearly independent. The elements of Z' may be tested to determine their effect, and elements that affect characteristics of interest may be exposed to the user to control synthetic image generation.

Figure 4:
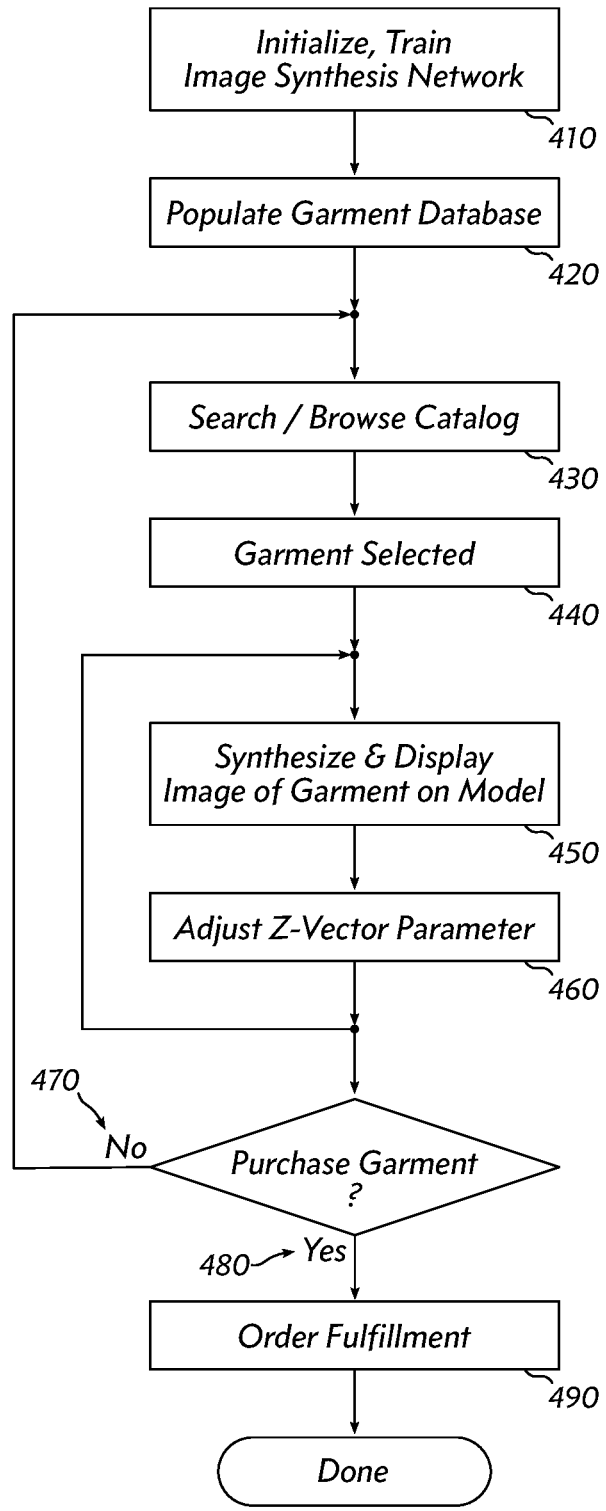
FIG. 4 is a flow chart outlining a more comprehensive application of an embodiment.

FIG. 4 outlines a method used by a complete application built around an image synthesizer according to an embodiment of the invention. To begin, a system operator initializes and trains a neural network as described above, using a training set of image pairs where one member of each pair depicts a garment, and the other member of each pair depicts a model wearing the garment (410). Next, a database of garment images is populated (420). These images are similar to the first images of the training set, and may even include the training images. These are, for example, images of garments offered for sale by the system operator.

When a customer visits the operator's system (e.g., when she accesses an e-commerce web site), she may search or browse the catalog of garments using any suitable prior-art method (430). For example, garments may be grouped and presented by color, style, weight, designer, size, price, or any other desired arrangement. When the user selects a garment (440), the system synthesizes and displays an image of the garment on a model (450). The user may be offered an array of controls which are connected to suitable elements of the Z-vector, and she may adjust those parameters as desired (460). When a parameter is adjusted, the system synthesizes and displays a new image of the garment on the model (450).

If the user decides not to purchase this garment (460), for example by clicking a "Back" button or returning to a list of search results, she may continue to view other garments for sale (430). If the user decides to purchase the garment (480), then information about the selected garment (e.g., a SKU) is passed to a prior-art order-fulfillment process for subsequent activity (490).

An embodiment of the invention may combine a garment selection control with controls for other aspects of image generation (skin tone, pose, body shape, accessories, etc.) Then, by manipulating individual controls of this plurality of controls, the user can change the garment (leaving the skin tone, pose, and accessories alone), or switch among accessories (leaving skin tone, pose and garment alone). This embodiment permits quick, self-directed comparisons among complete "outfits" or "looks," a capability that is currently provided at significant expense by human fashion coordinators, and consequently mostly unavailable to shoppers of ordinary or modest means.

FIG. 5 outlines another application of an image synthesis network as described above. As before, the method begins by initializing and training an image synthesis network using a training set of image pairs (500). Next, the system acquires a garment image (510), synthesizes an image of the garment on a model (520), and stores the synthesized image (530). If there are more garment images to process (540), these steps are repeated, resulting in a library of synthesized images showing a variety of garments of which images were acquired and processed. The image synthesis may use randomly-chosen Z-vector parameters, which will yield a variety of different model skin tones, shapes, poses, and accessories in the synthesized image libraries.

When there are no more garment images to process (550), synthesized images from the library may be incorporated into a catalog layout (560) and printed (570); or a plurality of static web pages comprising one or more synthetic images may be generated (580), and those web pages may be served to visitors to a web site (590). This process may reduce the cost to produce a catalog of product images or a website displaying many garments.

It is appreciated that the method may be integrated with a prior-art garment processing sequence, such as a consignment dealer that receives many heterogenous garments from a variety of manufacturers. These garments may be passed through a steam chamber to dissipate storage or transport odors and to remove wrinkles. The garments may be placed on a mannequin during this process, and an image of the freshly-steamed garment may be automatically captured at the end. This image may be delivered to the process outlined in FIG. 5, as the "acquired image" at 510. Multiple views of the garment may be acquired, and may permit the synthesis of a greater variety of "garment on model" images, provided that the neural network has been trained with a correspondingly greater variety of image pairs.

An embodiment of the invention may be a machine-readable medium, including without limitation a non-transient machine-readable medium, having stored thereon data and instructions to cause a programmable processor to perform operations as described above. In other embodiments, the operations might be performed by specific hardware components that contain hardwired logic. Those operations might alternatively be performed by any combination of programmed computer components and custom hardware components.

Instructions for a programmable processor may be stored in a form that is directly executable by the processor ("object" or "executable" form), or the instructions may be stored in a human-readable text form called "source code" that can be automatically processed by a development tool commonly known as a "compiler" to produce executable code. Instructions may also be specified as a difference or "delta" from a predetermined version of a basic source code. The delta (also called a "patch") can be used to prepare instructions to implement an embodiment of the invention, starting with a commonly-available source code package that does not contain an embodiment.

In some embodiments, the instructions for a programmable processor may be treated as data and used to modulate a carrier signal, which can subsequently be sent to a remote receiver, where the signal is demodulated to recover the instructions, and the instructions are executed to implement the methods of an embodiment at the remote receiver. In the vernacular, such modulation and transmission are known as "serving" the instructions, while receiving and demodulating are often called "downloading." In other words, one embodiment "serves" (i.e., encodes and sends) the instructions of an embodiment to a client, often over a distributed data network like the Internet. The instructions thus transmitted can be saved on a hard disk or other data storage device at the receiver to create another embodiment of the invention, meeting the description of a non-transient machine-readable medium storing data and instructions to perform some of the operations discussed above. Compiling (if necessary) and executing such an embodiment at the receiver may result in the receiver performing operations according to a third embodiment.

In the preceding description, numerous details were set forth. It will be apparent, however, to one skilled in the art, that the present invention may be practiced without some of these specific details. In some instances, well-known structures and devices are shown in block diagram form, rather than in detail, in order to avoid obscuring the present invention.

Some portions of the detailed descriptions may have been presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the preceding discussion, it is appreciated that throughout the description, discussions utilizing terms such as "processing" or "computing" or "calculating" or "determining" or "displaying" or the like, refer to the action and processes of a computer system or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, including without limitation any type of disk including floppy disks, optical disks, compact disc read-only memory ("CD-ROM"), and magnetic-optical disks, read-only memories (ROMs), random access memories (RAMs), eraseable, programmable read-only memories ("EPROMs"), electrically-eraseable read-only memories ("EEPROMs"), magnetic or optical cards, or any type of media suitable for storing computer instructions.

The algorithms and displays presented herein are not inherently related to any particular computer or other apparatus. Various general-purpose systems may be used with programs in accordance with the teachings herein, or it may prove convenient to construct more specialized apparatus to perform some method steps. The required structure for a variety of these systems will be recited in the claims below. In addition, the present invention is not described with reference to any particular programming language. It will be appreciated that a variety of programming languages may be used to implement the teachings of the invention as described herein.

The applications of the present invention have been described largely by reference to specific examples and in terms of particular allocations of functionality to certain hardware and/or software components. However, those of skill in the art will recognize that configurable, synthetic images of models wearing garments based on images of the garments alone can also be produced by software and hardware that distribute the functions of embodiments of this invention differently than herein described. Such variations and implementations are understood to be captured according to the following claims.

I claim:

1. A method comprising:
   initializing a Generative Adversarial Network ("GAN") comprising an analysis neural network and a synthesis neural network;
   training the analysis neural network to recognize characteristics of an input image of a training garment alone and encode the characteristics into a training Z-Vector having fewer components than the input image of the training garment alone has pixels, said training producing a trained analysis neural network;
   training the synthesis neural network to create a training synthetic image resembling a model wearing the training garment from the training Z-Vector, said training producing a trained synthesis neural network;
   presenting an instance image of an instance garment alone to the trained analysis neural network and obtaining a corresponding instance Z-Vector from the trained analysis neural network;
   presenting the instance Z-Vector to the trained synthesis neural network and obtaining a corresponding instance synthetic image from the trained synthesis neural network, said instance synthetic image resembling a model wearing the instance garment; and
   displaying the instance synthetic image.

2. The method of claim 1, further comprising:
   determining an effect of a subset of the training Z-Vector on a recognizable characteristic of the training synthetic image;
   adjusting a subset of the instance Z-Vector to produce a modified instance Z-Vector; and
   presenting the modified instance Z-Vector to the trained synthesis neural network and obtaining a corresponding modified synthetic image from the trained image synthesis neural network, said modified synthetic image being similar to the instance synthetic image, but different in the recognizable characteristic; and
   displaying the modified synthetic image.

3. The method of claim 2 wherein the recognizable characteristic of the training synthetic image is one of model skin tone, model pose, model body weight, model body shape, accessories, garment length, garment sleeve style, garment collar style or garment fit tightness.

4. The method of claim 1 wherein the synthesis neural network also receives information from at least one of:
a node of the analysis neural network at a similar depth to a receiving node of the synthesis neural network; or
a node of the analysis neural network at a different depth from the receiving node of the synthesis network.

5. A method comprising:
initializing a multi-layer neural network comprising an analysis neural network and a synthesis neural network;
training the analysis neural network to recognize characteristics of an input image of a garment alone and encode the characteristics into a Z-Vector having fewer components than the input image of the garment alone has pixels, said training producing a trained analysis neural network;
training the synthesis neural network to create an image resembling a model wearing the garment from the Z-Vector, said training producing a trained synthesis neural network;
presenting an instance image of an instance garment alone to the trained analysis neural network and obtaining a corresponding instance Z-Vector from the trained analysis neural network;
presenting the instance Z-Vector to the trained synthesis neural network and obtaining a corresponding synthetic image from the trained synthesis neural network, said synthetic image resembling a model wearing the instance garment; and
displaying the synthetic image.

6. The method of claim 5 wherein the multi-layer neural network is one of a Generative Adversarial Network, a Recurrent Neural Network, a Recurrent Inference Machine, or a Variational Autoencoder.

* * * * *